(12) United States Patent
Muthukrishnan et al.

(10) Patent No.: US 6,377,544 B1
(45) Date of Patent: Apr. 23, 2002

(54) SYSTEM AND METHOD FOR INCREASING THE SPEED OF DISTRIBUTED SINGLE AND MULTI-COMMODITY FLOW USING SECOND ORDER METHODS

(75) Inventors: Shanmugavelayut Muthukrishnan, New York, NY (US); Torsten Suel, Springfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/136,819

(22) Filed: Aug. 20, 1998

(51) Int. Cl.[7] .......................... H04L 12/26; H04L 12/56
(52) U.S. Cl. ..................... 370/229; 370/235; 370/413
(58) Field of Search ................... 370/229, 230, 370/231, 232–233, 235, 252–253, 412–414, 477

(56) References Cited

U.S. PATENT DOCUMENTS 6,147,969 A * 11/2000 Benmohamed et al. ..... 370/230
6,151,327 A * 11/2000 Sofman et al. .............. 370/477

OTHER PUBLICATIONS

Awerbuch et al., "A Simple Local–Control Approximation Algorithm for Multicommodity Flow", Foundations of Computer Science, 1993, pp. 459–468.*

Leighton et al., "An Approximate Max–Flow Min–Cut Theorem for Uniform Multicommodity Problems with Applications to Approximation Alogorithms", Foundations of Computer Science, 1988, pp. 422–431.*

* cited by examiner

Primary Examiner—Wellington Chin
Assistant Examiner—Maikhanh Tran
(74) Attorney, Agent, or Firm—Sofer & Haroun

(57) ABSTRACT

A system and method for increasing the speed of flow of a quantity of data or of a plurality of data types through a communication system. The communication system comprises a plurality of switches including a source and a sink, each of the switches connected to a neighboring switch by a communication link having a capacity, each of the links having a pair of queue buffers, and one queue buffer of each pair of queue buffers is located at each switch connected by a link. For a single data type, a flow is computed for each link as a function of a last previous amount of flow across the same link. In the multi-data type case, a weighted queue difference is computed as a function of a last previous amount of flow between the same pair of queues and an amount of flow $f_i$ of said data type i is routed across each said link such that $\Sigma_{1 \leq i \leq K} f_i (\Delta'_i(e) - f_i)$ is maximized. In other embodiments of the invention, the system and method resolves the contention between different data types for the capacity of a communication link with and without a normalization factor, and adjusts flow so as not to exceed the capacity of a communication link or the amount of a data available to be routed by the sending queue buffer.

43 Claims, 5 Drawing Sheets

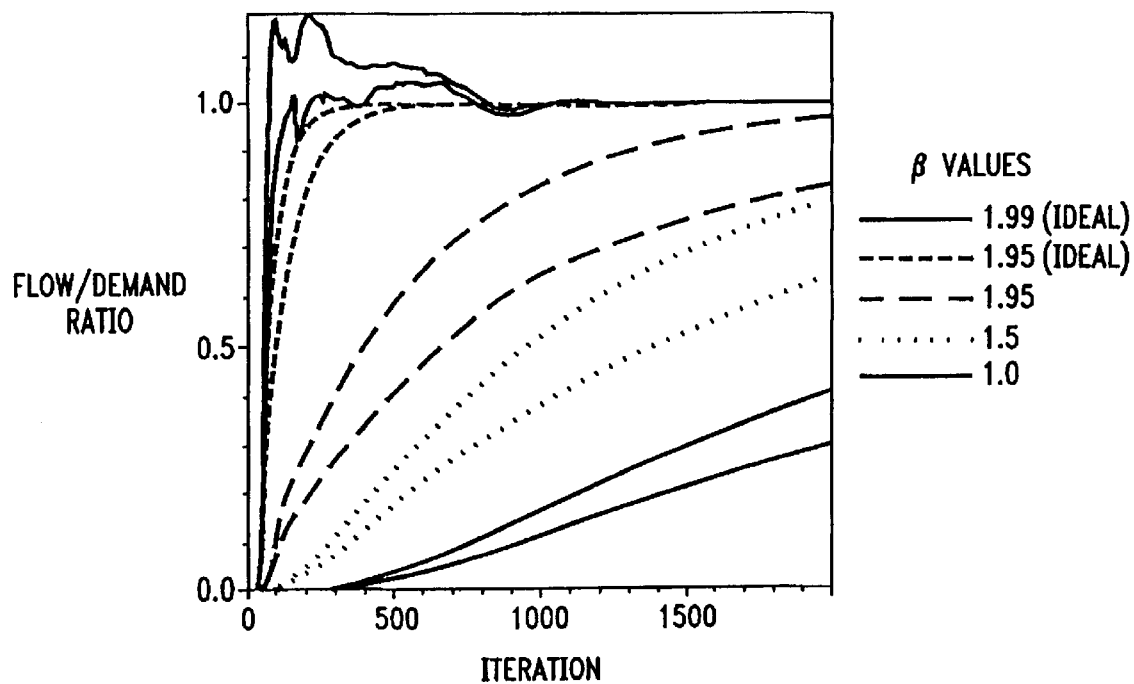
FIG. 5
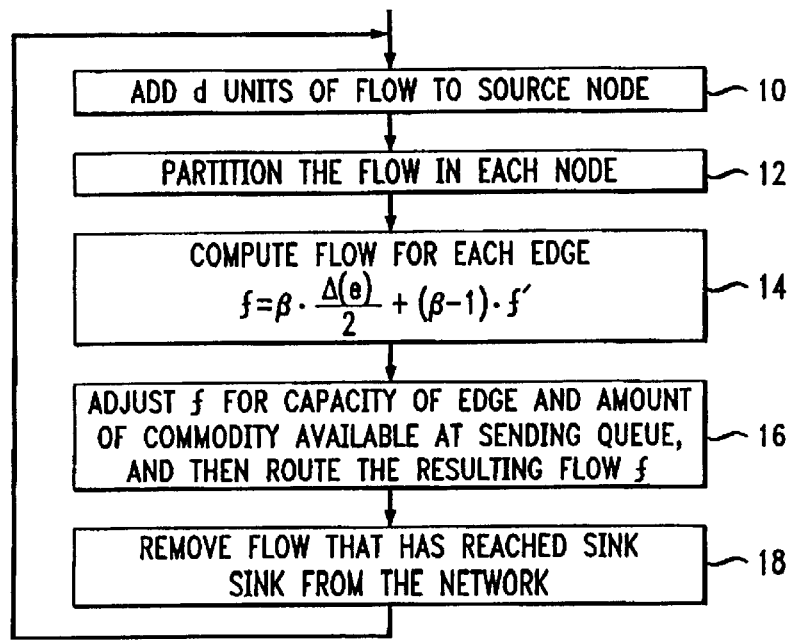
FIG. 6 FLOWCHART FOR MAX-FLOW SECOND ORDER METHOD

SYSTEM AND METHOD FOR INCREASING THE SPEED OF DISTRIBUTED SINGLE AND MULTI-COMMODITY FLOW USING SECOND ORDER METHODS

FIELD OF THE INVENTION

This invention relates generally to distributed networks, and more particularly to optimizing flow through a local-control network.

BACKGROUND OF THE INVENTION

One of the primary goals of any communications system is to be able to optimize the flow of information through the system. Typically, a communication system may include a network of communication nodes through which data packets are transferred from a source node to a destination node. In order to be able to accomplish the above-stated goal, it is necessary to develop a methodology which determines the optimal routing of information through a network.

In the prior art, those who sought to determine the optimal flow of information through a communication system utilized flow theory directed to determining the maximum flow of any type of commodity through a distributed network. In a typical communication network, commodities are various data types such as text, voice, video graphics, etc., routed from a source node to a sink or destination node. A source node is a point within the distributed network at which some commodity originally exists. A sink node is another point within the network at which the same commodity is desired to be routed to. A distributed network may have many nodes, located within such network and configured such that a commodity must be routed through a number of these nodes in order to travel from the source node to the sink node.

FIG. 1 illustrates a part of a sample network, showing source node 10, which transfers data 60 to sink node 110 across edge 50a. Data divider 30 operates to divide data within the queues of source node 10, the purpose and method of which will be discussed in detail later. Queues 20, 20a and 120 of source node 10 and sink node 110, respectively, are memory spaces which store the data prior to transfer from one node to the other.

Each edge 50 has two queues connected to it—one at each end of the edge. Thus, an edge which connects one node and a neighboring node has one queue in the first node and the other queue in the second node. FIG. 1 shows edge 50a with two queues connected to it, namely queue 20a and queue 120. The other edges 50 are shown connected to the other queues 20 in source node 10. Though not shown, the other end of each of the other edges 50 is connected to a queue of a neighboring node. It should also be noted that in this figure, the source node and the sink node are situated adjacent to each other, such that they are not seperated from each other by several other nodes (as would be the case in the typical network flow problem), and are thus meant only to illustrate some of the features of a typical node within a distributed network.

FIG. 2, which will be explained more fully later, illustrates a mesh graph, having 14 nodes (of the type of node illustrated in FIG. 1) and 3 levels. This graph represents just one way in which a distributed network can be configured, although it is understood that there are countless other possible configurations. In particular, a mesh graph may be representative of an asynchronous transfer mode (hereinafter "ATM") network, in which commodities such as audio or video data are routed by switches through the ATM network across connections having pre-determined bandwidth. In this figure, the numbered circles are communication nodes, such as those employed in a computer communication network. As shown, the nodes are connected by arrows. The arrows show the manner in which the computer terminals are connected to each other and the directions in which they can transfer data through the network. Thus, for example, if a person using the computer terminal designated as node 14 desires data from a host computer terminal designated as node 1, the arrows represent the possible paths for the data to be transmitted from node 1 to node 14. In this example, the data is the commodity sought.

Alternatively, the communications system illustrated in FIG. 2 could also be representative of a fiber optic telephone network, in which each node is representative of a call switching station and each arrow is representative of a fiber optic cable over which a telephone call or data transmission may be sent. In this manner, a call (the commodity in this example), could be made from a telephone designated by node 1 (the "source" node) to a telephone designated by node 14 (the "sink" node), and that call could be routed through the fiber optic network in any manner shown by the arrows.

FIG. 3 is provided to illustrate a sample of an RMF graph. The sample graph is a 3×3×2 RMF graph, showing another way in which a distributed network can be configured. As in the ATM network, the numbered circles represent nodes and the arrows represent edges over which desired information may be routed. Of course, it is understood that FIGS. 2 and 3 describe just two of many types and configurations of communications systems which could exist, and that a communication system is just one type of network which routes commodities between routing nodes.

Referring back to the prior art which sought to determine optimal flows through a network, in addition to a source node and a sink node, each commodity also has an associated demand, which is the amount of that commodity that must be transmitted from its source to its sink. When only one type of commodity exists in a distributed network, a problem called the max flow problem exists. The max flow problem is the question of how to maximize a feasible flow, of a single type of commodity, through a network from a source to a sink. A flow is feasible if the transfer rate satisfies the demand for the commodity while remaining within the network's capacity constraints.

The network's capacity constraints are expressed through constraints placed on the edges of the network. An edge, as shown and described previously, is the connection between two neighboring nodes over which an amount of commodity can be transferred. Thus, in the max flow problem, it is desired to find the maximum flow of the single commodity through the network that does not exceed the capacities of the edges. Referring to the examples of communications systems discussed above, the capacity of the edges of a computer or internet system may be the bandwidth or data transfer capabilities of the connections, while the capacity of the edges of the fiber optic system may be the number of optical strands in a fiber optics trunk cable, and total channel bandwidth between two nodes.

The prior art also considered multicommodity flow. Multicommodity flow is an arrangement wherein a network simultaneously transmits multiple types of commodities through a network such that the total amount of flow on each edge is no more than the flow capacity of the edge. Multicommodity flow arises in a wide variety of contexts, such as product distribution, traffic planning and scheduling problems, but particularly in packet-routing and communications systems, such as networks that route data, voice, audio, video graphics, etc.

An additional consideration for those seeking to optimize flow through a communication system is the problem presented by each node's inability to monitor the flow at every other point in the network. Particularly, in packet-routing and communications systems employing a distributed network, it is typically necessary for each node of the network to be locally-controlled. A locally-controlled network is one in which each node communicates only with neighboring nodes and has no global knowledge of the network. Packet-routing and communications systems are typically locally-controlled, since it is impractical for each node of a packet-routing or communications network to have knowledge of the existing flow conditions between every node pair within the network. It is practical, however, for each node of a network to have knowledge of the existing flow conditions between itself and adjacent or neighboring nodes. Thus, local-control algorithms for analyzing multi-commodity flow arrangements are appropriate to examine in the context of packet-routing and communications networks.

Local-control algorithms for the max flow and multicommodity flow have been designed previously, as shown in Baruch Awerbuch and Tom Leighton, "A Simple Local-Control Approximation Algorithm for Multicommodity Flow", 1993, and "Improved Approximation Algorithms for the Multicommodity Flow Problem and Local Competitive Routing in Dynamic Networks", 1994, both incorporated herein by reference. In the former, the authors describe a max flow algorithm, which is performed in successive iterations. During each iteration, four steps are performed in each node and on each edge of the network.

In the first step, d units of flow are added to the source node. In the second step, the flow is partitioned such that the flow that is currently in a node is divided equally among the local queues of the edges incident to the node. In the third step, flow is routed across the edge in an amount equal to the lesser value of either $\Delta(e)/2$ or $c(e)$, where $\Delta(e)$ is the difference in the amount of flow between the two queues, and $c(e)$ is the capacity of the edge in the direction from the fuller to the emptier queue. Finally, in the fourth step, all flow that has reached the sink, or destination node, is removed from the network.

The method described by these four steps is referred to herein as the first-order max flow method. This method is very slow and can take thousands of iterations to reach an acceptable approximation of the exact maximum flow value. FIG. 4 shows the results of using a first-order max flow method in order to find the maximum flow for a 20-level mesh graph with 402 nodes and 1180 edges. The first-order max flow method requires more than 8000 iterations in order to come within one percent of the maximum flow value of 1826.

In the same reference, the authors also describe a multi-commodity flow arrangement, given a network with N nodes, M edges and K commodities, wherein each edge has a capacity $c(e)$ and each commodity i has a demand, $d_i$. Like the single commodity case, the algorithm in the multi-commodity case proceeds in rounds, each round consisting of four phases.

In the first phase, new flow is added to the sources, such that $d_i$ units of commodity i are added to source node $s_i$. In the second phase, for each node v and each commodity i, the amount of commodity i that is currently in node v is partitioned evenly among the local queues of the incident edges. For each edge e, an attempt is made to balance the amount of each commodity between the two queues at the endpoints of the edge. Additionally, the system resolves the contention between different commodities for the capacities of each edge. In the third phase, any commodity that has reached the appropriate sink, or destination node, is removed from the network. Finally, in the fourth phase, each commodity is reallocated within each node so that all the queues for each commodity i are equal in each node. The method described by these four phases is called herein the first-order multi-commodity flow method. Similar to the first-order max-flow method, this prior art multi-commodity flow arrangement requires several thousand iterations in order to converge to an acceptable approximation of the exact maximum flow value.

In the second reference, the authors describe an alternate prior art method to determine the optimal flow of multiple commodities through a distributed network. This method involves a bounded queuesize local-control algorithm for routing multi-commodity flows in a dynamically changing distributed network. The algorithm described is similar to the algorithm described in the first reference. A significant difference, however, is the process of storing excess flow in an overflow buffer. Potentials are calculated for the source queue and the overflow buffer, and flow is pushed across the edges so as to minimize the total potential of the queues in each edge, subject to the edge's capacity contraints.

These, and other algorithms for speeding the flow of commodities through networks, are notoriously slow. In many cases, thousands of iterations are required in order to find the flow amount which maximize the flow through the network.

Therefore, a need exists for a system and method which speeds up distributed single and multi-commodity flow in a distributed network.

SUMMARY OF THE INVENTION

In accordance with one embodiment of the invention, a system and method for directing the flow of a quantity of data or of a plurality of data types through a communication system is employed. The communication system, which can be a network, comprises a plurality of switches including a source and a sink, each of the switches connected to a neighboring switch by a communication link having a capacity, each of the links having a pair of queue buffers so that one queue buffer of each pair of queue buffers is located at each switch connected by a link.

For a single data type, a flow is added at a source. In each switch, the flow is partitioned evenly among the queue buffers of the communication links of each switch. An amount of flow is computed for each link as a function of a difference between the amount of data in each of the queue buffer pairs, and, as a function of a previous amount of flow between the queue buffer pairs. The computed amount of flow of the data is routed across each link, and the routed data is then removed when it reaches a sink or a destination node. This process is iteratively repeated until a maximum flow value is reached.

In accordance with another embodiment of the invention, the amount of flow is computed for each link as $f=(\beta)(\Delta(e)/2)+(\beta-1)(f')$, wherein $\Delta(e)$ is defined as the difference in an amount of data between a pair of queue buffers, $f'$ is the last previous amount of flow between the same pair of queue buffers, and $\beta$ is a value between 1.0 and 2.0.

In the multi-data type case, a flow of a data type i is added at the source; in each switch, the flow of each type is partitioned evenly among the queue buffers of the links of each switch; a difference in the amount of a data type i between each of the queue buffers of a switch and the queue buffers of each neighboring node is computed as $\beta'i(e)=(\beta)(\Delta(e))+(2.0)(\beta-1)(f')$, wherein $\Delta_i'(e)$ is a weighted queue difference between the pair of queue buffers, f' is a last previous amount of flow between the same pair of queue buffers, and $\beta$ is a value between 1.0 and 2.0; an amount of flow $f_i$ of said data type i is routed across each said link such that $\Sigma_{1 \leq i \leq K} f_i (\Delta'_i(e)-f_i)$ is maximized subject to the capacity constraint $\Sigma f_i \leq c(e)$; and the data type i which arrives at the sink is removed from the system network. The process is iteratively repeated until a optimal flow for all data types is reached.

In another embodiment of the invention, the system and method, in the multi-data type case, resolves the contention between different data types for the capacity of a communication link by finding flow values for each data type so as to guarantee that the data types with the biggest queue buffer difference across a link will have a priority. In another embodiment of the invention, the system and method prioritizes data types with the biggest queue buffer difference across a link, subject to a normalization factor. In still another embodiment of the invention, the single or multi-data type flow is adjusted so as not to exceed the capacity of an link. In still another embodiment of the invention, the single or multi-data type flow is adjusted so as not to exceed the amount of a data available to be routed by the sending queue buffer.

BRIEF DESCRIPTION OF THE DRAWINGS

The present invention will be further understood from the following description with reference to the accompanying drawings, in which:

FIG. 5 is a graph that shows the results of utilizing the second-order multi-commodity method to solve a flow problem involving a 5×5×20 RMF graph with 25 commodities routed between the first and last layer of the graph, in accordance with one embodiment of the present invention;

FIG. 6 is a flow chart which illustrates the steps performed by the system in utilizing the second-order max flow method, in accordance with one embodiment of the present invention;

DETAILED DESCRIPTION OF THE INVENTION

One embodiment of the present invention, as previously discussed, is primarily though not exclusively directed to the optimization of information flow, such as text, voice, video or audio data, through a communication system, such as an ATM, computer or telephone network. In the present invention, data originates at a source and is finally received at a sink. The switches are locally controlled, and are thus well suited to currently used communication systems. It is noted that the inventive features described herein can be employed in a variety of flow systems including transportation and logistics environments.

Figure 1:
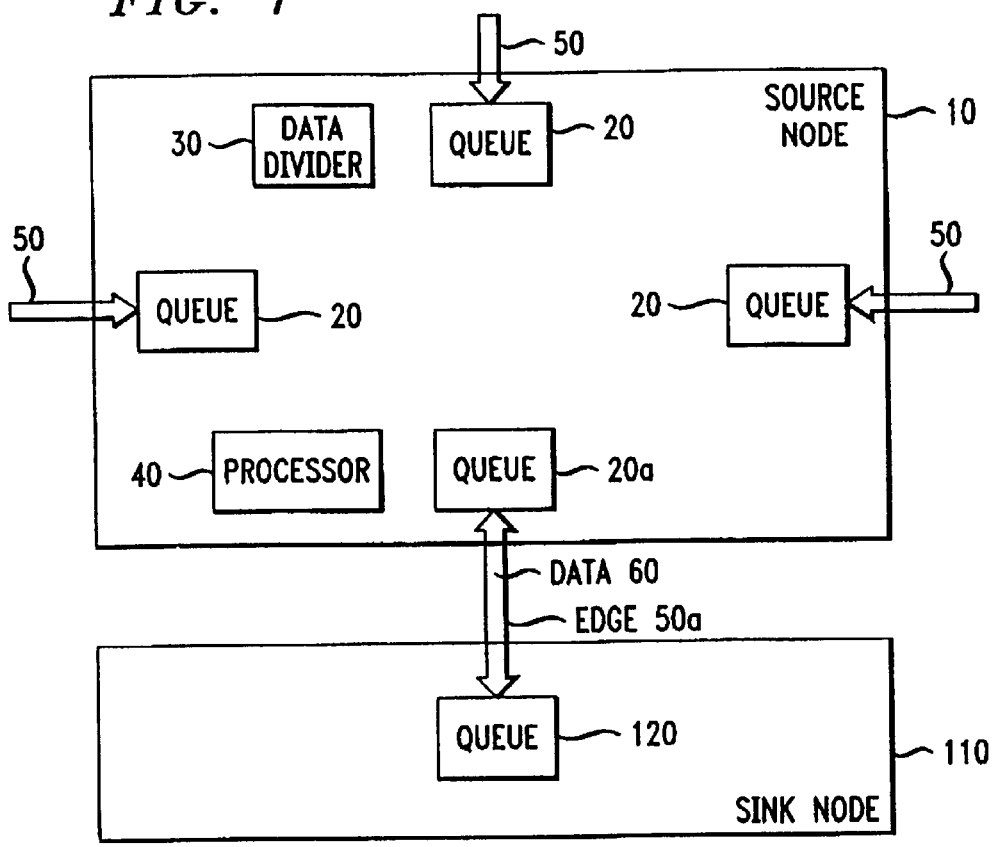
FIG. 1 illustrates the components of a node, in accordance with one embodiment of the present invention.
Figure 2:
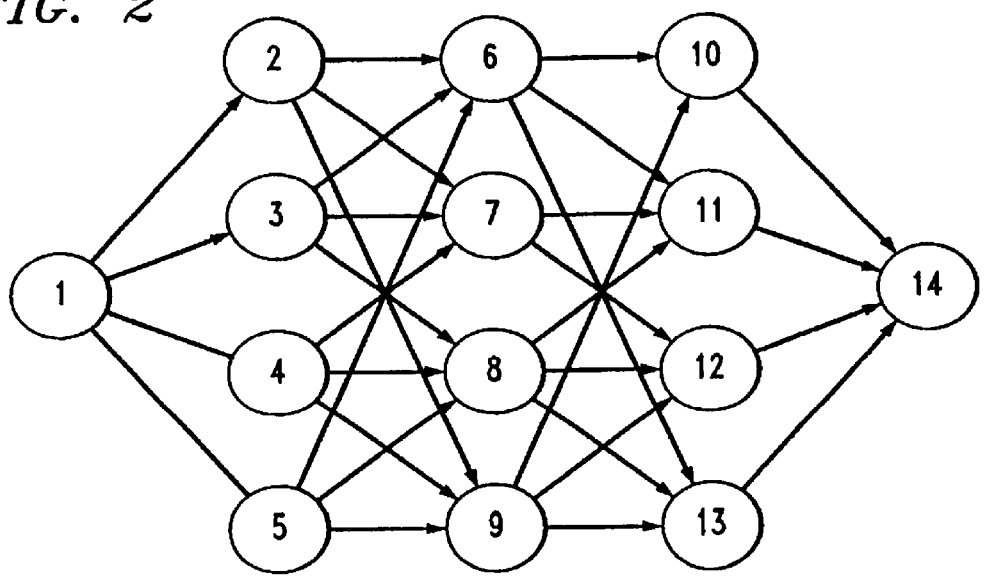
FIG. 2 illustrates a sample mesh graph having 3 levels and 14 nodes, employed in one embodiment of the present invention.
Figure 3:
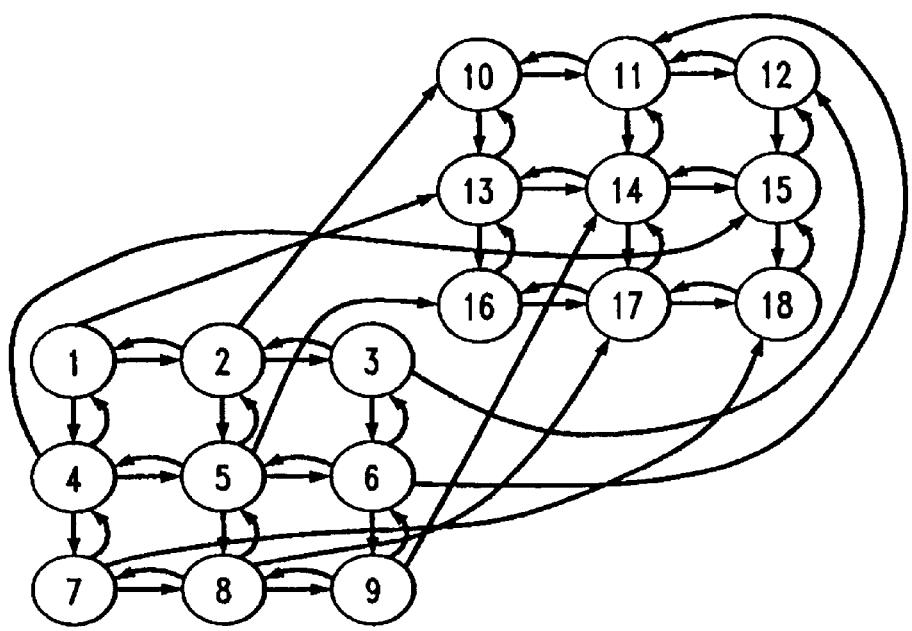
FIG. 3 illustrates a sample of an RMF graph, specifically a 3×3×2 RMF graph, as employed in one embodiment of the present invention.
Figure 4:
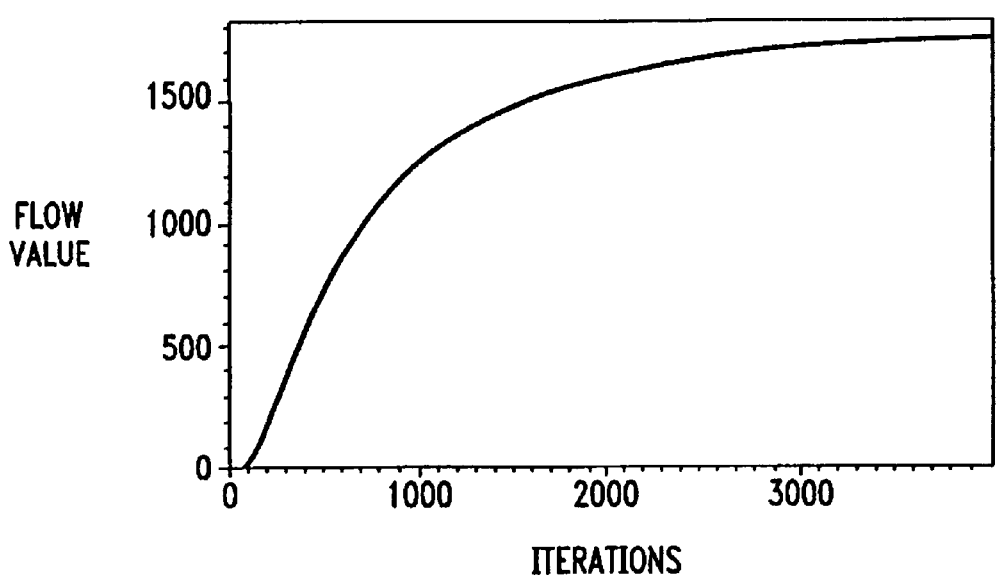
FIG. 4 is a graph that shows the results of using a first-order max-flow method in order to find the maximum flow for a 20-level mesh graph with 402 nodes and 1180 edges, in accordance with one embodiment of the present invention.

FIG. 1, as previously discussed, illustrates a typical node pairing. In the present invention, the nodes shown are switches coupled together and configured for routing information. Data 60 is transferred from queue buffer 20a of source switch 10 to queue buffer 120 of sink switch 110 across a communication link 50a. Data divider 30 divides data which arrives at switch 10 to be distributed by queue 20. Processor 40 performs the calculating and routing functions to be described more fully later.

The second-order max flow method, in accordance with one embodiment of the present invention, computes an amount of data flow to be routed across the communication links of a communication system in a current iteration as a function of the flow that would be sent according to the first-order method and the flow that was sent in the previous iteration. FIG. 6 is a flow chart which illustrates the steps performed by a system employing the second-order max flow method, in accordance with one embodiment of the invention.

At step 10 of FIG. 6, a flow of d units of data are added to the communication system at the source. At step 12, all the flow in the network is partitioned such that the amount of data of each type that is currently in a switch is divided equally among the local queue buffers of the switches.

At step 14, the desired flow across each link e is computed as a function of: the difference between the amount of data in each pair of queue buffers; and of the previous amount of flow between the queue buffer pair. Specifically, the flown f is computed as:

$$f=(\beta)\times(\Delta(e)/2)+(\beta-1)\times(f'), \quad (1)$$

wherein $\Delta(e)$ is defined as the difference in the amount of data between the two queues, and f' is the amount of flow that was routed between the two queues in the previous iteration. Referring to FIG. 1, $\Delta(e)$ can further be described as the amount of data that is in queue 20a of sink node 10 minus the amount of data that is in queue 120 of source node 110. The additional parameter $\beta$ is such that when $\beta=1.0$, the above formula for the second-order method is the same as the formula for the first-order method, in which flow is routed across an edge in an amount equal to the lesser value of either $\Delta(e)/2$ or $c(e)$, wherein $c(e)$ is the capacity of the edge.

It should also be noted that the present invention has both an idealized and a non-idealized version of the second-order method. The non-idealized method has the constraint that a flow of a particular data type can only be routed across an edge if the resulting amount of the particular data type, at both ends of the edge, is non-negative. Thus, in this embodiment, a sending queue can not send to a receiving queue more of data type i than it has actually has of data type i. The idealized method does not have this constraint. The idealized and non-idealized versions exist in both the single and multi-commodity cases, as will be discussed in greater detail later.

In step 16, the amount of flow actually routed across a communication link is obtained. This amount of flow is obtained by adjusting the value of f found in step 14 according to the capacity of the link, and according to the amount of data available at the sending queue buffer. In order to avoid getting a negative amount of data at a queue, in the non-idealized version, it is necessary to adjust flow accordingly whenever the value of f, as computed in step 14, exceeds the available link capacity or whenever the value of f exceeds the amount of data available at the sending queue buffer. In the non-idealized version, the adjustment is such that the amount of flow actually routed across the link is equal to the lesser of: the amount calculated in step 14; the available link capacity; or the amount of data available at the sending queue buffer. As discussed in the previous paragraph, no such adjustment is necessary in the idealized version, since negative queue values are permissible in that version.

In step 18, all flow that has reached the sink is removed from the communication system. Thus, data which has reached its intended destination node is not stored by the system.

Steps 10 through 18 are then repeated iteratively at each switch until a satisfactory maximum flow value is reached. In the context of a communication system, such as an ATM network, these steps are preferably implemented during each iteration at each switch, and because the steps performed by each switch involve knowledge of only the queue buffer states at itself and its immediately adjacent switches, local-control is maintained.

Figure 7:
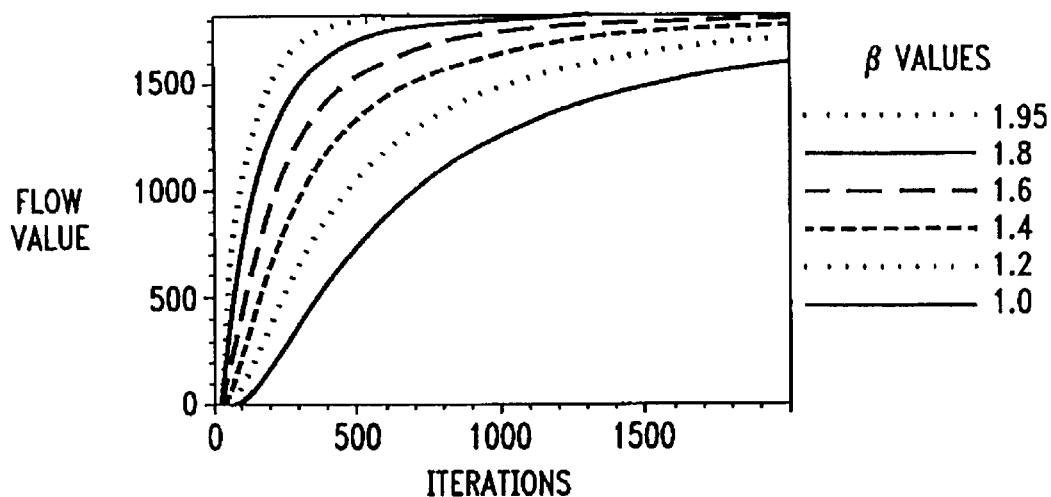
FIG. 7 is a graph that shows the results of using the second-order max-flow method in order to find the maximum flow for a 20-level mesh graph with 402 nodes and 1180 edges, in accordance with one embodiment of the present invention.

The second-order method vastly improves upon the first-order method in the number of iterations which must be performed in order to calculate the value of the max-flow. For instance, FIG. 7 shows the results of using the second-order max-flow method in order to find the maximum flow for a 20-level mesh graph with 402 nodes and 1180 edges. As stated previously, a mesh graph is representative of a typical communication system such as an ATM network. FIG. 7 shows the convergence of the non-idealized second-order method utilizing various $\beta$ values ranging from 1.0 (the lowest curve) to 1.95 (the highest curve). The rate of convergence increases significantly as $\beta$ is increased from 1.0 to 1.95. When $\beta=1.0$, which as previously mentioned is equivalent to the first-order method, it takes approximately 1500 iterations to come within 10% of the exact maximum flow value and more than 8000 iterations in order to come within one percent of the exact maximum flow value of 1826. However, at $\beta=1.95$, the second-order method employed in one embodiment of the present invention is within 0.001% of the exact value after performing 1500 iterations.

It should be noted that in accordance with experimental evaluation, the use of $\beta$ values which are less than 1.0 leads to the method converging on a maximum flow value more slowly than the first order method, while the use of a $\beta$ value greater than 2.0 results in the method not converging on a maximum flow value.

Figure 8:
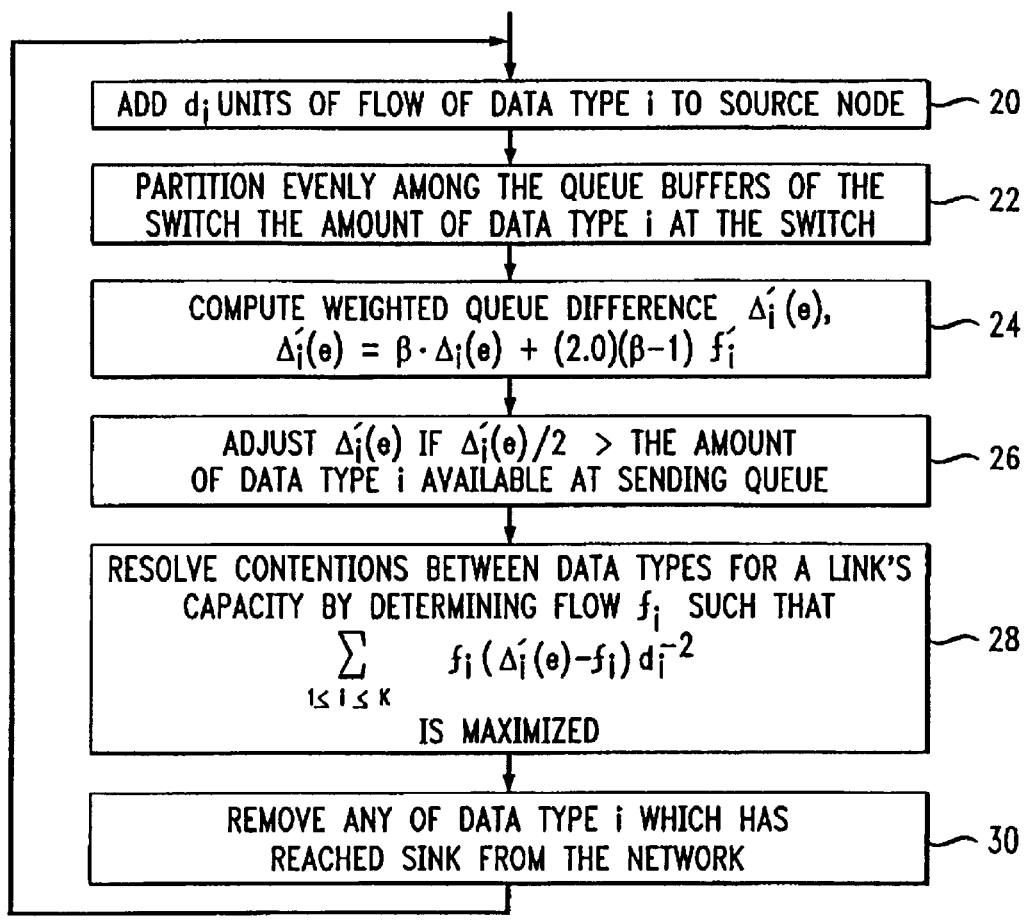
FIG. 8 is a flowchart that illustrates the steps of the second-order multi-commodity method, in accordance with one embodiment of the present invention.

A second-order method is also employed by one embodiment of the present invention to solve the multi-commodity flow arrangement. In the context of a communications system, the second order method would be used to optimize the flow of K different types of data, through a communication system having N switches connected by M communication links, wherein each link has a capacity c(e) and each data type i has a demand $d_i$. FIG. 8 is a flowchart that illustrates the steps of the second-order multi-commodity method.

At step 20, new flow is added to the source switches, such that $d_i$ units of data type i are added. At step 22, for each switch v and each data type i, the amount of data type i that is currently in switch v is partitioned evenly among the local queue buffers of the switch. At step 24, a weighted queue difference is calculated, which is the amount of data type i between the two queue buffers at the endpoints of communication link e, and is computed as:

$$\Delta_i'(e)=(\beta)(\Delta(e))+(2.0)(\beta-1)(f'), \quad (2)$$

wherein $\Delta(e)$ is the difference between the amounts of data in the queue buffers, f' is the amount of data type i that was routed between the queue buffers in the previous iteration, and $\beta$ is an additional parameter, preferably $2>\beta>1$.

At step 26, the weighted queue difference $\Delta_i'(e)$ is adjusted if $\Delta_i'(e)/2$ is greater than the amount of data type i available at the sending queue buffer. The method which performs this adjustment step is the previously mentioned non-idealized version. In another embodiment of the invention referred to as the idealized version, this step can be eliminated, and the communication system permits negative amounts of a data type at a sending queue buffer when implementing the method of the present invention. As stated before, the idealized arrangement is not applicable in all cases. It is noted, however, that when applicable, the idealized arrangement converges at a faster speed than the non-idealized arrangement.

Figure 9:
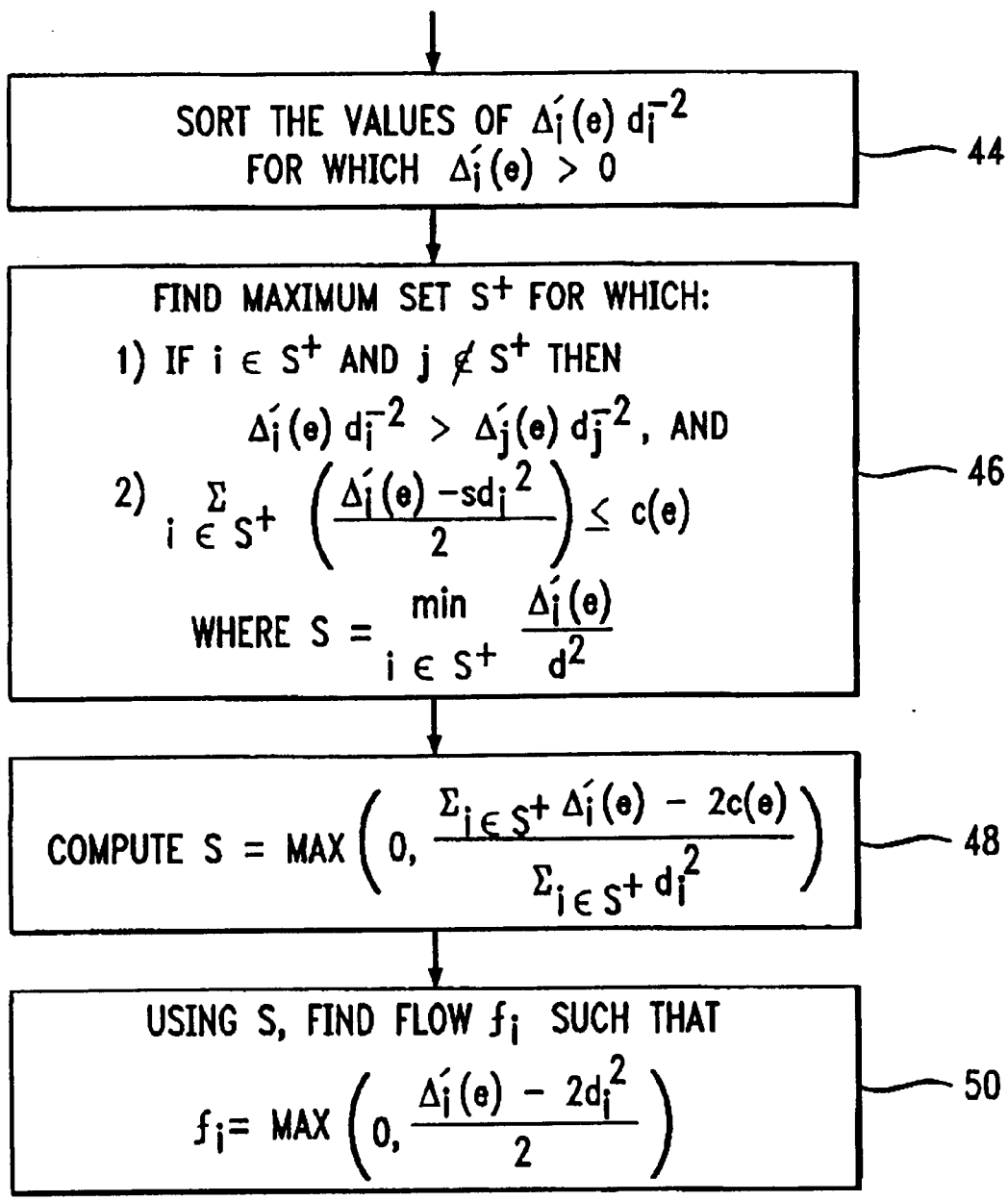
FIG. 9 is a flow chart which illustrates how the contention between different commodities for the capacities of the edges is resolved, in accordance with one embodiment of the present invention.

Several different commodities may be contending simultaneously for the capacity of the edges. In the context of a communication system, this means that several different data types may be contending for the capacities of the communication links. At step 28, the method of the present invention, in accordance with one embodiment, resolves the contention between various commodities for the capacity of a communication link, and attempts to balance the amount of data in the queue buffers across the communication link. In general, $f_i$ units of data type i are routed across communication link e for each data type i, where $f_1, f_2, \ldots, f_k$ are chosen, subject to the capacity constraint, to maximize:

$$\sum_{1 \leq i \leq K} f_i(\Delta_i'(e) - f_i)d_i^{-2}, \quad (3)$$

wherein $\Delta_i'(e)$ is the weighted queue difference as defined by Equation 2, $d_i$ is the demand for the data type ($d_i^{-2}$ is utilized in this equation as a normalization factor, which prevents high-volume or high-demand data types from swamping out lower-volume or lower-demand data types) and K is the number of types of data. The steps required to resolve the contention are illustrated in the flowchart of FIG. 9, which is explained more fully later.

At step 30, any data that has reached the appropriate sink is removed from the communication system. According to the method, the steps 20 through 30 are then repeated iteratively until a maximum flow value is determined.

As previously mentioned, in accordance with one embodiment of the invention, the contention between different data types for the capacities of the communication links is resolved. One method resolves the contention by calculating optimal flow values for each data type by seeking to route a flow for data type i such that $\Delta_i(e)d_i^{-2}$ is maximized. In other words, the total flow of all the data types combined is optimal when the flow values for the data types which have the greatest difference in queue buffer amounts are prioritized. Specifically, $f_i$ units of data type i are pushed across communication link e for each data type i, where $f_1, f_2, \ldots, f_K$ are chosen to maximize, subject to the capacity constraint $\Sigma f_i < c(e)$:

$$\sum_{1 \le i \le K} f_i(\Delta_i'(e) - f_i) d_i^{-2}, \qquad (4)$$

wherein $\Delta_i'(e)$ is the weighted queue difference as defined by Equation 2, $d_i$ is the demand for the data type ($d_i^{-2}$ is utilized in this equation, and in subsequent equations, as a normalization factor) and K is the number of data types. In other words, the various f values are chosen to maximize the total flow of the system at each step, subject to the normalization factor. Ideally, the summation is maximized when the larger sending queue of the system transmits to the smaller receiving queue a data type amount equal to half the difference between the two queues, resulting in the balancing of the neighboring queues; however, this simple solution will usually violate the capacity constraint.

In order to maximize the summation of Equation (4), we take the derivative of $f_i(\Delta_i'(e) - f_i)d_i^{-2}$. As is known in calculus, a maximum value of the equations $f_i(\Delta_i'(e) - f)d_i^{-2}$ can be found when its derivative or slope equals zero. Designating slope, s, also known as a marginal contribution factor, as the derivative of $f_i(\Delta_i'(e) - f_i)d_i^{-2}$ yields $s = (\Delta_{i'(e)} - 2f_i)d_i^{-2}$ whenever $f_i > 0$, and thus $f_i = \max(0, (\Delta_i'(e) - s\, d_i^2)/2)$.

As discussed with regards to Equation (4), when s equals zero, each data type which has a non-zero flow would optimally send half of the queue difference. When contentions must be resolved, this is not possible because the capacity of the communication link is exceeded. As the value of s increases above zero, however, a value of s will eventually be reached at which the capacity of the communication link is not exceeded by the flows corresponding to such s value of each contributing data type. At this value of s, all data types contributing an amount of flow won't be sending the optimal half of the queue difference, but will instead be sending an amount which optimizes the combined flow while remaining within the capacity constraints. Stated mathematically, the optimal value of s is, therefore, the minimum $s \ge 0$ such that:

$$\Sigma_i \max(0, [\Delta_i'(e) - s d_i^2]/2) \le c(e), \qquad (5)$$

wherein $\Delta_i'(e)$ is the weighted queue difference as defined in Equation 2, c(e) is the capacity of the communication link, $d_i$ is the demand for the data type and s is the marginal contribution factor. Equation 5 merely states that the optimal value of s is that value for which the summed flows as nearly as possible equals the capacity of the communication links.

FIG. 9 details one method, in accordance with one embodiment of the present invention, to compute marginal contribution factor s and use it to calculate appropriate flow amounts for each commodity when the commodities are contending for the capacity of an edge. At step 44, the method sorts the values of $\Delta_i'(e)d_i^{-2}$ for which $\Delta_i'(e) > 0$ so that, for example, the largest value of $\Delta_i'(e)d_i^{-2}$ is first, the second largest $\Delta_i'(e)d_i^{-2}$ is second, etc.

At step 46, a maximal set $S^+$ of data types (where $S^+$ is a subset of all data types) is found, for which:

1) if i belongs to the set $S^+$ and j does not belong to the set $S^+$, then $\Delta_i'(e)d_i^{-2} > \Delta_j'(e)d_j^{-2}$, and 2) $\sum_{i \in S^+}[\Delta_i'(e) - s d_i^2]/2) \le c(e)$, where $s = \min_{i \in S^+}\Delta_i'(e)/d_i^2$.

After finding the set $S^+$, the method next proceeds to step 48. At step 48, the method computes the marginal contribution factor, s, by setting:

$$s = \max(0, [\Sigma_{i \in S^+}\Delta_i'(e) - 2c(e)]/[\Sigma_{i \in S^+}d_i^2]), \qquad (6)$$

wherein $\Delta_i'(e)$ is the weighted queue difference as defined in Equation 2, c(e) is the capacity of the communication link, $d_i$ is the demand for the data type, $S^+$ is the subset of data types computed in step 46.

Lastly, at step 50, the value of marginal contribution, s, found in step 48 is plugged into Equation 5 to obtain flow value $f_i$. The flow value $f_i$ is the flow of data type i across communication link e which resolves the contention of the competing data types for the capacity of communication link e, while optimizing, or maximizing, the flow of all data types through the communication system. As stated previously, steps 44 through 50 are performed as a sub-method, which fully describes step 28 of the overall method which is shown and described in the flowchart of FIG. 8.

FIG. 5 shows the results of the first- and second-order multi-commodity flow method as utilized to solve a flow problem involving an RMF graph, in this case a 5×5×20 RMF graph with 25 commodities routed between the first and last layer of the graph. The value measured on the y-axis is the flow/demand ratio z, such that at least z times the demand of every commodity arrives at its sink in a given step. If or when z becomes equal to 1.0, then all demands are completely satisfied, which is the desired result. For each, case there is shown two curves, corresponding to the two out of 25 commodities which experienced the minimum (lower curve) and the maximum (upper curve) flow/demand ratios in each computation step. For each case, the remaining 23 commodities are not shown but are located between the minimum and maximum curves. The prior art first-order method is represented by $\beta = 1.0$. After 2000 iterations, the first-order method achieves only approximately 30% and 40% of the demands, respectively. Thus, this method is also extremely slow and inefficient.

The advantage of the second-order method over the first-order method to solve a multi-data type flow problem is significant. FIG. 5 shows the convergence behavior for the non-idealized second-order method with $\beta = 1.0$, 1.5 and 1.95, and for the idealized second-order method with $\beta = 1.95$ and 1.99. The non-idealized second order method in which $\beta = 1.5$ and 1.95 performs significantly better than the first order method, represented by $\beta = 1.0$. However, the idealized versions of the second-order method, in which $\beta = 1.95$ and 1.99 are superior still. When $\beta = 1.95$, the idealized second-order method essentially converges to the full demands in less than 500 iterations. It should be noted that the results of each line of FIG. 5, in the above examples, were obtained holding $\beta$ constant until the optimal flow value was obtained. It is within the contemplation of the present invention, in accordance with one embodiment, to vary the value of $\beta$ as a function of time or as a function of the number of iterations which have been performed by a switch.

While there has been shown and described particular embodiments of the invention, it will be obvious to those skilled in the art that changes and modifications can be made therein without departing from the invention, and therefore, the appended claims shall be understood to cover all such changes and modifications as fall within the true spirit and scope of the invention.

We claim:

1. A method for directing the flow of a quantity of data through a communication system, said communication system comprising a plurality of switches including a source and a sink, each of said plurality of switches connected to a neighboring switch by a communication link having a capacity, each said link having a pair of queue buffers, one queue buffer of each said pair of queue buffers located at each said switch connected by said link, said method comprising:

(a) adding a flow of said data at said source;
   (b) in each said switch, partitioning evenly among said queue buffers of said switch an amount of flow at said switch;
   (c) computing an amount of flow to be routed across each said link as a function of a difference between the amount of data in each of said pair of queue buffers, and as a function of a previous amount of flow between said pair of queue buffers;
   (d) routing an amount of flow of said data across each said link;
   (e) removing said data from said sink; and
   (f) repeating steps (a)–(e).

2. The method of claim 1, wherein said step of computing an amount of flow to be routed across each said link further comprises computing $f=(\beta)(\Delta(e)/2)+(\beta-1)(f')$, wherein f is said amount of flow to be routed between said pair of queues, $\Delta(e)$ is a difference in the amounts of said data between said pair of queues, f' is a previous amount of flow between said pair of queues, and $\beta$ is a numerical value.

3. The method of claim 2, wherein $\beta$ is a numerical value between 1.0 and 2.0.

4. The method of claim 2, wherein $\beta$ is varied as a function of time.

5. The method of claim 2, wherein $\beta$ is varied as a function of the number of iterations which have been performed by said switch.

6. The method of claim 1, further comprising, after said computing step, the step of adjusting said flow so as not to exceed said capacity of said link.

7. The method of claim 1, further comprising, after said computing step, the step of adjusting said flow so as not to exceed said amount of said data available to be routed by said queue buffer.

8. A method for directing the flow of a plurality of types of data through a communication system, said communication system comprising a plurality of switches including a source and a sink, each of said plurality of switches connected to a neighboring switch by a communication link having a capacity, each said link having a pair of queue buffers, one queue buffer of each said pair of queue buffers located at each said switch connected by said link, said method comprising:

(a) for each of said plurality of data type, adding an amount of flow of said data type at said source;
   (b) in each said switch, partitioning evenly among said queue buffers of said switch an amount of flow of said data type at said switch;
   (c) computing a weighted queue difference between said queue buffer of said switch and said queue buffer of each said neighboring switch, as a function of a difference between an amount of said data type in said queue buffer of said switch and an amount in said queue buffer of said neighboring switch, and as a function of a previous amount of flow routed between said pair of queue buffers;
   (d) routing an amount of flow of each said data type across each said link, said routed amount of flow computed as a function of said weighted queue difference;
   (e) removing said data type from said sink; and
   (f) repeating steps (a)–(e).

9. The method of claim 8, wherein said weighted queue difference is $\Delta_i'(e)=(\beta)(\Delta(e))+(2.0)(\beta-1)(f')$, wherein f' is a last previous amount of flow between said pair of queue buffers, $\beta(e)$ is a difference in the amounts of said data type between said pair of queues, and $\beta$ is a value between 1.0 and 2.0.

10. The method of claim 8, wherein said products to be summed are further multiplied by a normalization factor, $d_i^{-2}$, wherein $d_i$ is a demand of data type i.

11. The method of claim 8, further comprising, after said computing step, the step of adjusting said weighted queue difference if half of said weighted queue difference is greater than an amount of said data type available to be routed by said queue buffer.

12. The method of claim 8, further comprising, after said computing step, the step of adjusting said weighted queue difference so as not to exceed said capacity of said link.

13. The method of claim 8, wherein said amount of flow of each said data type to be routed across each said link is further computed such that the summation of the product of said flows multiplied by the difference between said weighted queue difference and said amount of flow is maximized.

14. The method of claim 8, further comprising resolving contentions between said plurality of data types for said capacity of said links by finding a marginal contribution factor, said marginal contribution factor corresponding to the derivative of each said flow of said data types, said marginal contribution factor comprising the smallest value at which the sum of said corresponding flows of said data types does not exceed said capacity of said links.

15. The method of claim 8, wherein said amounts of flow of each said data type i to be routed are such that $\Sigma_{1\leq i\leq K}f_i(\Delta'_i(e)-f_i)$ is maximized, wherein K is the number of data types, $f_i$ is said amount of each said data type to be routed and $\Delta'_i(e)$ is said weighted queue difference.

16. The method of claim 15, wherein said amounts of flow of each said data type i to be routed such that $\Sigma_{1\leq i\leq K}f_i(\Delta'_i(e)-f_i)$ is maximized is further computed by performing the steps of:

(a) sorting the values of $\Delta_i'(e)d_i^{-2}$ for which $\Delta'(e)>0$;
   (b) finding a set $S^+$ of said commodities for which:
      1) if i belongs to the set $S^+$ and j does not belong to the set $S^+$, then $\Delta_i'(e)d_i^{-2}>\Delta_j'(e)d_j^{-2}$, and 2) $\sum_{i \in S^+} [\Delta'_i(e) - sd_i^2]/2) \leq c(e)$, where $s = \min_{i \in S^+} \Delta'_i(e)/d_i^2$;

(c) computing s by setting $s=\max(0,[\Sigma_{i\in S+}\Delta'_i(e)-2c(e)]/[\Sigma_{i\in S+}d_i^2])$; and
   (d) calculating flow value $f_i$ by computing $f_i=\max(0,(\Delta_i'(e)-sd_i^2)/2)$.

17. A system for directing the flow of a quantity of data through a communication system, said communication system comprising a plurality of switches including a source and a sink, each of said plurality of switches connected to a neighboring switch by a communication link having a capacity, each said link having a pair of queue buffers, one queue buffer of each said pair of queue buffers located at each said switch connected by said link, said system comprising:
  (a) a data divider, located at each of said switches and configured to partition evenly among said queue buffers of said switch an amount of flow at said switch; and
  (b) a processor located at each of said switches and configured to compute an amount of flow to be routed across each said link as a function of a difference between the amount of data in each of said pair of queue buffers, and as a function of a previous amount of flow between said pair of queue buffers, said processor causing said amount of data flow across each said link.

18. The system of claim 17, wherein said switch is further configured for computing an amount of flow f to be routed between said pair of queues across each said link, $f=(\beta)(\Delta(e)/2)+(\beta-1)(f')$, wherein $\Delta(e)$ is a difference in the amounts of said data between said pair of queues, f' is a last previous amount of flow between said pair of queues, and $\beta$ is a numerical value.

19. The system of claim 18, wherein $\beta$ is a numerical value between 1.0 and 2.0.

20. The system of claim 18, wherein $\beta$ is varied as a function of time.

21. The system of claim 18, wherein $\beta$ is varied as a function of the number of iterations which have been performed by said switch.

22. The system of claim 17, wherein said switch is further configured for adjusting said flow so as not to exceed said capacity of said link.

23. The system of claim 17, wherein said switch is further configured for adjusting said flow so as not to exceed said amount of said data available to be routed by said queue buffer.

24. A system for directing the flow of a plurality of types of data through a communication system, said communication system comprising a plurality of switches including a source and a sink, each of said plurality of switches connected to a neighboring switch by a communication link having a capacity, each said link having a pair of queue buffers, one queue buffer of each said pair of queue buffers located at each said switch connected by said link, said system comprising:
  (a) a data divider, located at each of said switches, and configured to partition evenly among said queue buffers of said switches an amount of flow of said data type at said switch; and
  (b) a processor, located at each of said switches, and configured to compute a weighted queue difference between said queue buffer of said switch and said queue buffer of each said neighboring switch, as a function of a difference between an amount of said data type in said queue buffer of said switch and an amount in said queue buffer of said neighboring switch, and as a function of a previous amount of flow routed between said pair of queue buffers, said processor causing said amount of flow of said data type to be routed across each said link, said routed amount of flow computed as a function of said weighted queue difference.

25. The system of claim 24, wherein said switch is further configured to compute said weighted queue difference as $\Delta_i'(e)=(\beta)(\Delta(e))+(2.0)(\beta-1)(f')$, wherein f' is a last previous amount of flow between said pair of queue buffers, $\Delta(e)$ is a difference in the amounts of said data type between said pair of queues, and $\beta$ is a value between 1.0 and 2.0.

26. The system of claim 24, wherein said products to be summed are further multiplied by a normalization factor, $d_i^{-2}$, wherein $d_i$ is a demand of data type i.

27. The system of claim 24, wherein said switch is further configured, after said computing step, to adjust said weighted queue difference if half of said weighted queue difference is greater than an amount of said data type available to be routed by said queue buffer.

28. The system of claim 24, wherein said switch is further configured, after said computing step, to adjust said weighted queue difference so as not to exceed said capacity of said link.

29. The system of claim 24, wherein said amount of flow of each said data type to be routed across each said link is further computed such that the summation of the product of said flows multiplied by the difference between said weighted queue difference and said amount of flow is maximized.

30. The system of claim 24, wherein said switches are further configured to resolve contentions between said plurality of data types for said capacity of said links by finding a marginal contribution factor, said marginal contribution factor corresponding to the derivative of each said flow of said data types, said marginal contribution factor comprising the smallest value at which the sum of said corresponding flows of said data types does not exceed said capacity of said links.

31. The system of claim 24, wherein said amounts of flow of each said data type i to be routed are such that $\Sigma_{1 \leq i \leq K} f_i (\Delta_i'(e)-f_i)$ is maximized, wherein K is the number of data types, $f_i$ is said amount of each said data type to be routed and $\Delta_i'(e)$ is said weighted queue difference.

32. The system of claim 31, wherein, in order to calculate said amounts of flow of each said data type i to be routed such that $\Sigma_{1 \leq i \leq K} f_i (\Delta_i'(e)-f_i)$ is maximized, said switch is further comprises:
  (a) a sorting unit so as to sort the values of $\Delta_i'(e)d_i^{-2}$ for which $\Delta_i'(e)>0$;
  (b) a calculator unit so as to find a set $S^+$ of said commodities for which:
    1) if i belongs to the set $S^+$ and j does not belong to the set $S^+$, then $\Delta_i'(e)d_i^{-2} > \Delta_j'(e)d_j^{-2}$, and $$2) \sum_{i \in S^+} [\Delta_i'(e)-sd_i^2]/2) \leq c(e), \text{ where } s = \min_{i \in S^+} \Delta_i'(e)/d_i^2;$$

(c) a computer unit so as to compute s by setting s max $(0, [\Sigma_{i \in S+} \Delta_i'(e)-2c(e)]/[\Sigma_{i \in S+} d_i^2])$; and
  (d) a calculating unit for calculating flow value $f_i$ by computing $f_i=\max(0,[\Delta_i'(e)-sd_i^2]/2)$.

33. In a communication system for directing the flow of a quantity of data through a plurality of switches, each switch having a queue buffer coupled to a corresponding queue buffer of a neighboring switch, a method for operating each of said switches comprising the steps of:
  (a) partitioning evenly among said queue buffers of said switch an amount of flow at said switch;
  (b) computing an amount of flow to be routed from said switch to a neighboring switch as a function of a difference between the amount of data in said queue buffers of said switches, and as a function of a previous amount of flow between said queue buffers; and
  (c) routing said computed amount of flow from said switch to a neighboring switch.

34. The method of claim 33, wherein said step of computing an amount of flow comprises computing $f=(\beta)(\Delta(e)/2)+(\beta-1)(f')$, wherein f is said amount of flow to be routed between said switch and said neighboring switch, $\Delta(e)$ is a difference in the amounts of said data between said pair of queues, f' is a previous amount of flow between said pair of queues, and $\beta$ is a numerical value.

35. The method of claim 34, wherein $\beta$ is a numerical value between 1.0 and 2.0.

36. The method of claim 34, wherein $\beta$ is varied as a function of time.

37. The method of claim 34, wherein $\beta$ is varied as a function of the number of iterations which have been performed by said switch.

38. In a communication system for directing the flow of a plurality of types of data through a plurality of switches each switch having a queue buffer coupled to a corresponding queue buffer of a neighboring switch, a method for operating each of said switches comprising the steps of:

(a) partitioning evenly among said queue buffers of said switch an amount of flow at said switch;

(b) computing a weighted queue difference between said queue buffer of said switch and said corresponding queue of a neighboring switch as a function of a difference between an amount of said data type in said queue buffer of said switch and an amount in said queue buffer of said neighboring switch, and as a function of a previous amount of flow routed between said pair of queue buffers; and (c) routing an amount of flow of each said data type from said switch to said neighboring switch said routed amount of flow computed as a function of said weighted queue difference.

39. The method of claim 38, wherein said weighted queue difference is $\Delta_i'(e)=(\beta)(\Delta(e))+(2.0)(\beta-1)(f')$, wherein f' is a last previous amount of flow between said pair of queue buffers, $\Delta(e)$ is a difference in the amounts of said data type between said pair of queues, and $\beta$ is a value between 1.0 and 2.0.

40. The method of claim 38, further comprising the step of summing said data types and further multiplying said summed products by a normalization factor, $d_i^{-2}$, wherein $d_i$ is a demand of data type i.

41. The method of claim 38, further comprising, after said computing step, the step of adjusting said weighted queue difference if half of said weighted queue difference is greater than an amount of said data type available to be routed by said queue buffer.

42. The method of claim 38, wherein said amounts of flow of each said data type i to be routed are such that $\Sigma_{1 \le i \le K} f_i (\Delta_i'(e)-f_i)$ is maximized, wherein K is the number of data types, $f_i$ is said amount of each said data type to be routed and $\Delta_i'(e)$ is said weighted queue difference.

43. The method of claim 42, wherein said amounts of flow of each said data type i to be routed such that $\Sigma_{1 \le i \le K} f_i(\Delta_i'(e)-f_i)$ is maximized is further computed by performing the steps of:

(a) sorting the values of $\Delta_i'(e)d_i^{-2}$ for which $\Delta_i'(e)>0$;

(b) finding a set $S^+$ of said commodities for which:

1) if i belongs to the set $S^+$ and j does not belong to the set $S^+$, then $\Delta_i'(e)d_i^{-2} > \Delta_j'(e)d_j^{-2}$, and 2) $\sum_{i \in S^+} [\Delta_i'(e) - sd_i^2]/2) \le c(e)$, where $s = \min_{i \in S^+} \Delta_i'(e)/d_i^2$;

(c) computing s by setting s=max $(0, [\Sigma_{i \in S+} \Delta_i'(e) - 2c(e)] / [\Sigma_{i \in S+} d_i^2])$; and (d) calculating flow value $f_i$ by computing $f_i$=max $(0, (\Delta_i'(e) - sd_i^2)/2)$.

* * * * *